United States Patent [19]

Hein et al.

[11] Patent Number: 5,123,011
[45] Date of Patent: Jun. 16, 1992

[54] MODULAR MULTISTAGE SWITCH FOR A PARALLEL COMPUTING SYSTEM

[75] Inventors: Carl E. Hein, Cherry Hill; Richard M. Zieger, Mount Laurel, both of N.J.

[73] Assignee: General Electric Company, Moorestown, N.J.

[21] Appl. No.: 414,496

[22] Filed: Sep. 27, 1989

[51] Int. Cl.⁵ .............................................. H04J 3/24
[52] U.S. Cl. .................................. 370/58.1; 370/60; 340/825.8; 340/826
[58] Field of Search ............... 370/94.3, 60, 60.1, 370/58.1, 58.2, 58.3, 65, 65.5; 340/825.02, 825.8, 825.79, 826; 379/271, 272, 273; 178/3

[56] References Cited

U.S. PATENT DOCUMENTS

| | | | |
|---|---|---|---|
| 3,226,692 | 12/1965 | Fuller et al. | 364/200 |
| 3,546,390 | 12/1970 | Hackenberg et al. | 340/825.8 |
| 3,567,865 | 3/1971 | Chu et al. | 340/825.8 |
| 3,964,054 | 6/1976 | Annunziata et al. | 340/172.5 |
| 4,151,592 | 4/1979 | Suzuki et al. | 364/200 |
| 4,195,344 | 3/1980 | Yamazaki | 364/200 |
| 4,484,262 | 11/1984 | Sullivan et al. | 364/200 |
| 4,635,250 | 1/1987 | Georgiou | 370/65.5 |
| 4,707,781 | 11/1987 | Sullivan et al. | 364/200 |
| 4,731,724 | 3/1988 | Michel et al. | 364/200 |
| 4,761,780 | 8/1988 | Bingham et al. | 370/60 |
| 4,811,333 | 3/1989 | Rees | 370/58 |
| 4,817,084 | 3/1989 | Arthurs et al. | 370/60 |
| 4,833,468 | 5/1989 | Larson et al. | 340/825.8 |
| 4,845,736 | 7/1989 | Posner et al. | 379/27 |
| 4,910,730 | 3/1990 | Day, Jr. et al. | 370/60 |
| 4,968,977 | 11/1990 | Chinnaswamy et al. | 340/825.8 |

OTHER PUBLICATIONS

"On a class of Multistage Interconnection Networks", by Lin et al., published at pp. 694-702 of the Aug., 1980 issue of IEEE Transactions On Computers, vol. C-29, No. 8.

"A Survey of Interconnection Networks," by Feng, published at pp. 12-27 of the Dec., 1981 issue of Computer, published by IEEE.

"Packet Switching In Banyan Networks" by Tripathi et al., published in Interconnection Networks For Parallel And Distributed Processing published by the IEEE Computer Society Press IEEE Catalog No. EH0217-O, 1984.

16 Search Abstracts enclosed.

*Primary Examiner*—Benedict V. Safourek
*Assistant Examiner*—S. Hom
*Attorney, Agent, or Firm*—William H. Meise; Stephen A. Young; Clement A. Berard

[57] ABSTRACT

A switched inerconnection system for interconnecting the data input and output ports of a plurality of individual data processors, terminals, sensors, robots or the like of a parallel data processing system includes a plurality of identical modules and custom interconnections. Each module includes on-board interconnections between input and output ports for providing interconnections among the processors coupled to that module, for thereby reducing the number of customized interconnections between modules.

3 Claims, 9 Drawing Sheets

FIG. 6a
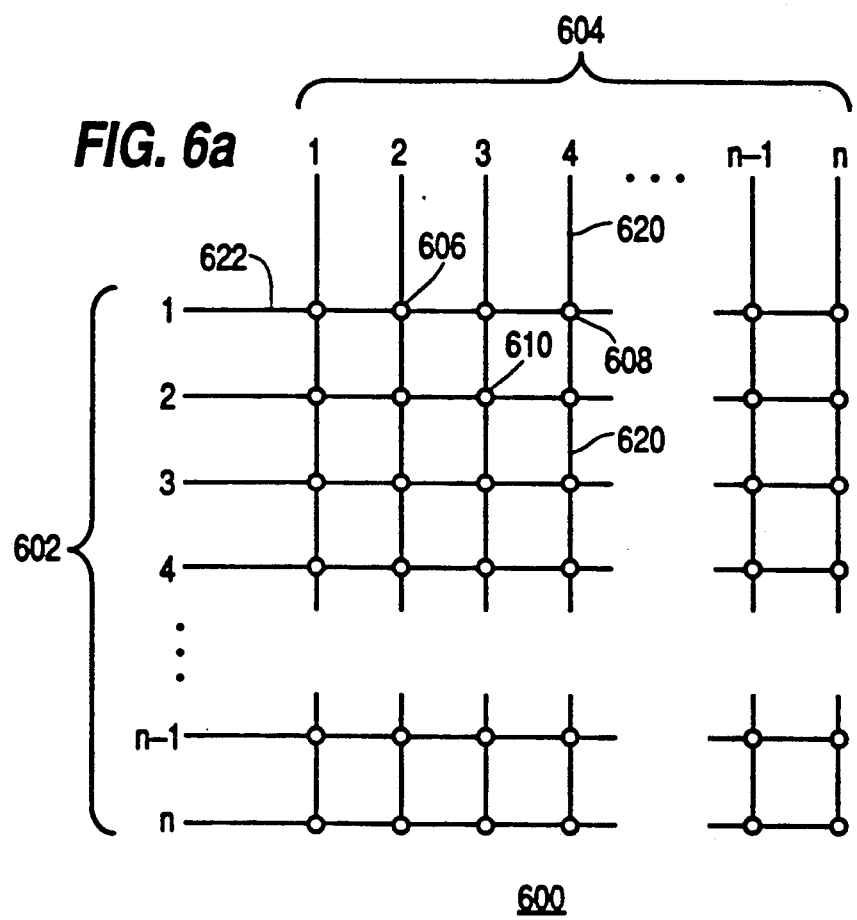
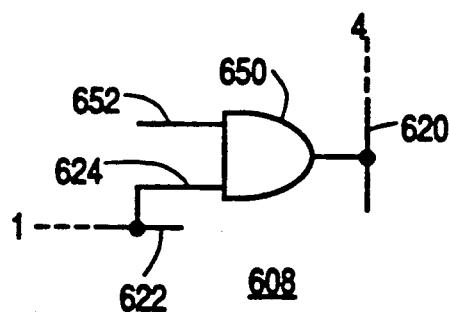
FIG. 6b

MODULAR MULTISTAGE SWITCH FOR A PARALLEL COMPUTING SYSTEM

BACKGROUND OF THE INVENTION

This invention relates generally to digital communications systems and more specifically to communication systems for interconnecting the processors of parallel computing systems.

The processing demands of modern information systems require very high information throughput, which may exceed the capabilities of serial data processors. Computers using parallel or simultaneous processors are used to maximize throughput. In general, such computing systems utilize large numbers of similar processors which are interconnected in a fixed manner to adapt them for optimum performance on a specific computational task. Such a fixed interconnection, however, may not be optimal for other tasks. For example, a fixed tree interconnection such as that illustrated in FIG. 1 may be optimal for a certain processing tasks such as searching, but may not be so well adapted for matrix operations. Various topologies are described in the article "A Study of Interconnection Networks" by Feng, published at pp. 12-27 of the Dec., 1981 issue of IEEE Computer.

Switched interconnection networks are known which allow adaptation of the interconnections between processors to various tasks. The physical implementations of such schemes tend to be complex and costly to manufacture. Manufacturing is well adapted for economical fabrication of large numbers of identical modules. When customized or low quantity modules must be made, or customized interconnections from module to module must be provided, the cost of manufacture increases dramatically.

A modular processor interconnection scheme is desired which is readily adaptable to a large number of different types of processor interconnections, and in which the number of connections made within each module is relatively large by comparison with the number of off-module connections to thereby reduce manufacturing costs.

SUMMARY OF THE INVENTION

A modular communication system for simultaneously communicating between a system output port and a system input port, where the system input and output ports include at least two data paths. The communication system includes first and second switch stages within each module. Each of the first and second switch stages includes an input port with a plurality of data paths and an output port, also with a plurality of data paths. A first interconnection arrangement on each module is connected to the input port of the first switch stage and is adapted to connect with an output port of the system. A second interconnection arrangement is connected to the output port of the second switch stage and is adapted to be coupled to the system input port. Third and fourth interconnection arrangements are provided, which are adapted for coupling the data paths of first or interconnection portions of the output port of the first switch stage and of the input port of the second switch stage with further modules. A second portion of the output port of the first switch stage is connected on the module to a second portion of the input port of the second switch stage.

DESCRIPTION OF THE DRAWING

FIG. 4b is a schematic diagram of an alternate connection arrangement for the arrangement of FIG. 4a;

FIG. 6a illustrates in simplified form a crossbar switch useable in the arrangement of FIG. 4, and FIG. 6b illustrates connections at a node of the crossbar switch of FIG. 6a;

DESCRIPTION OF THE INVENTION

Figure 1:
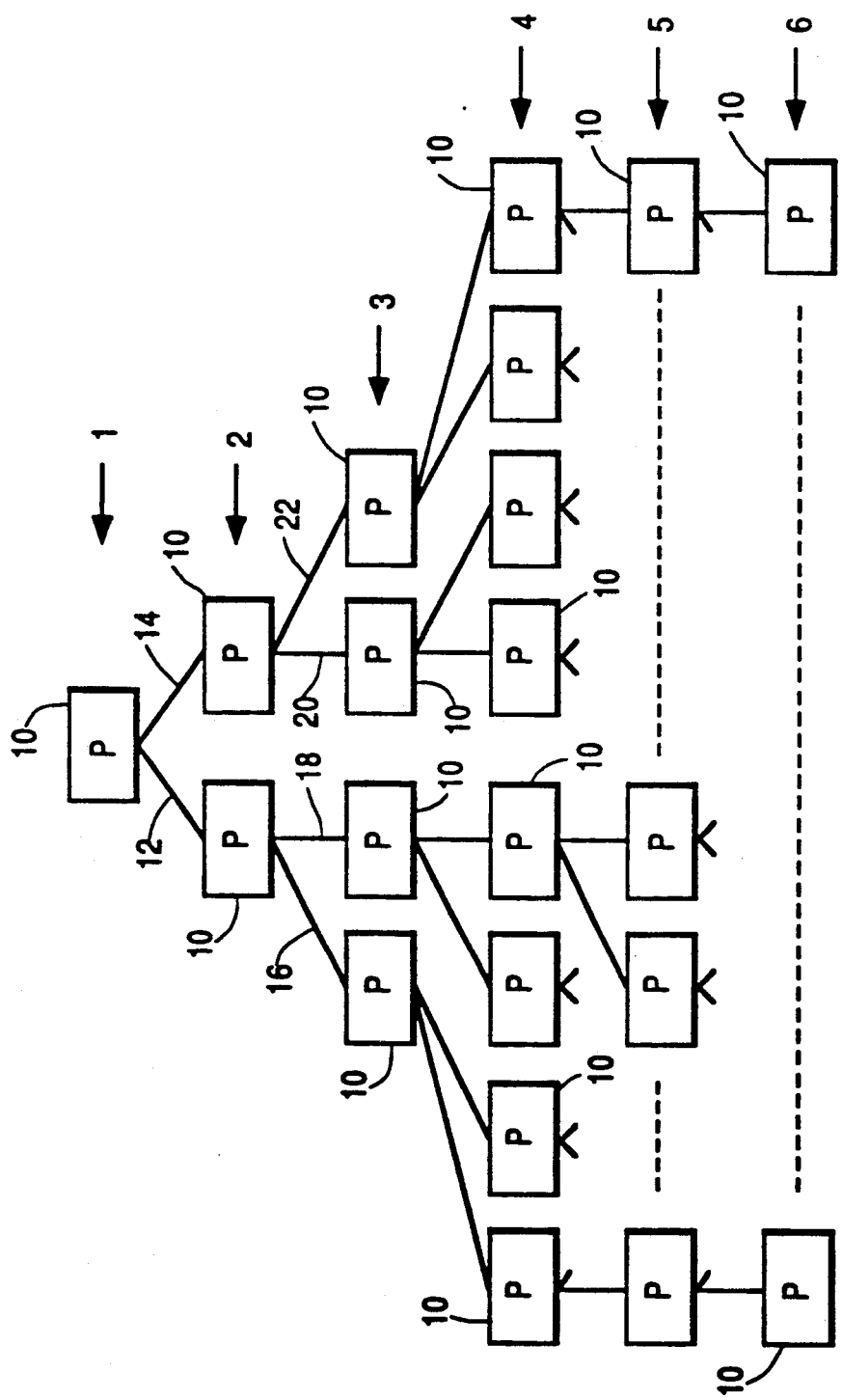
FIG. 1 illustrates a tree network of processors.

FIG. 1 illustrates a possible configuration for a parallel processing computer. In FIG. 1, a total of 63 out of 64 processing units (p) 10 are arrayed in a tree fashion, in six ranks numbered 1 through 6. Processor 10 of rank 1 is connected by two data paths 12 and 14 to inputs (or outputs depending upon the direction of information flow) of two further processors 10 of the second rank. Outputs of the two processors 10 of the second rank are connected by data paths 16, 18, 20 and 22 to four further processors 10 of rank 3. Those skilled in the art will immediately recognize that rank 4 includes 8 processors, rank 5 includes 16 processors and rank 6 includes 32 processors. Each processor is capable of handling words of a predetermined number of bits, such as 16 bits. Consequently, each data path, such as data path 12, 14, 16, 18, 20 and 22, and all the other data paths, must be capable of carrying 16-bit words. As is well known to those skilled in the art, such data paths may include 16 simultaneous bit paths, or a single bit path arranged for serial transmission of the bits.

Figure 2:
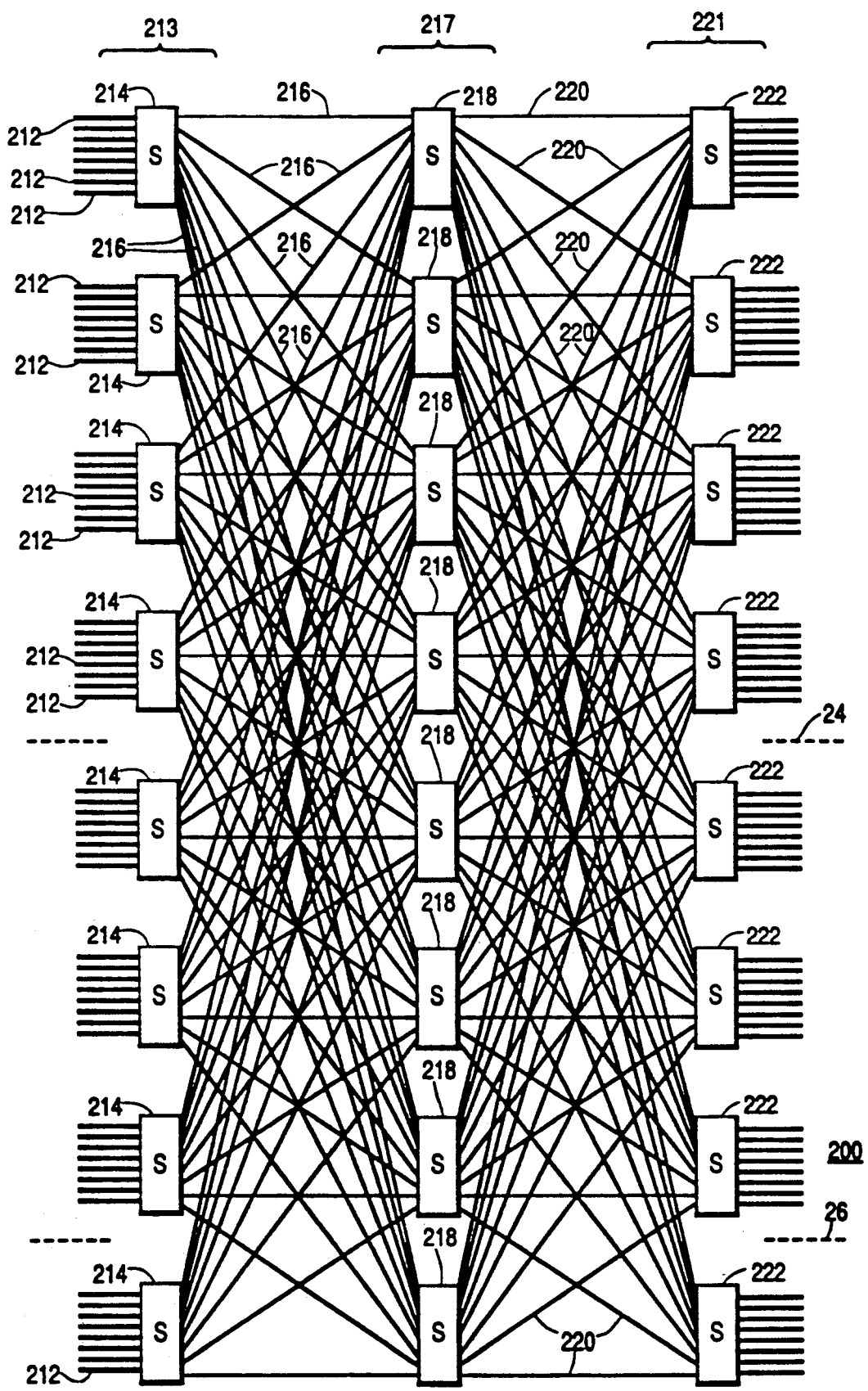
FIG. 2 illustrates a prior art full banyan network of crossbar switches adaptable for use in the arrangement of FIG. 1.

The tree arrangement illustrated in FIG. 1 is only one of many possible arrangements of the 64 processors 10 of the system. FIG. 2 illustrates a three-stage full banyan network with 64 data input paths and a 64 data output paths. Three stages 213, 217 and 221 of crossbar switches (5) are arranged at the left, center and right of FIG. 2, respectively. In FIG. 2, 64 data paths 212 at the left of the FIGURE are adapted to be connected to the output ports of the 64 processors 10 of a 64-processor computing system, such as the system of FIG. 1. Input data paths 212 are grouped into blocks of eight, which are coupled to the inputs of eight 8×8 crossbar switches designated 214 of first stage 213. Each first stage crossbar switch 214 accepts eight inputs 212, and can controllably couple any of its input data paths 212 to any of its output data paths. These connections may be made simultaneously, or more than one output port may be connected to each input port, while other output ports are connected individually to certain input ports. The output data paths of the uppermost crossbar switch 214 in FIG. 2 are designated 216. Each of the eight output data paths of each crossbar switch 214 is connected to an input data path of a different one of eight second stage 8×8 crossbar switches 218 of second stage 217. Each of the output data paths 220 of each second-stage crossbar switch 218 is connected to an input data path of a different one of eight 8×8 crossbar switches 222 of third stage 221. The eight output data paths of each crossbar switch 222 of third stage 221 of banyan network 200 are adapted to be connected to the input ports of the 64 processors or other devices associated with the computing system.

The eight output data paths of each first-stage crossbar switch 214 are distributed, as evenly as possible, among the eight second stage crossbar switches 218. Thus, if the second stage had less than eight crossbar switches, then some paths might be doubled (two or more paths 216 extending from the output of a particular first stage cross bar switch 214 to the input of a particular second stage crossbar switch 218), or some paths might be left unconnected. If the second stage had more than eight crossbar switches, some of the second stage crossbar switches might have less than all their input data paths connected.

Figure 7:
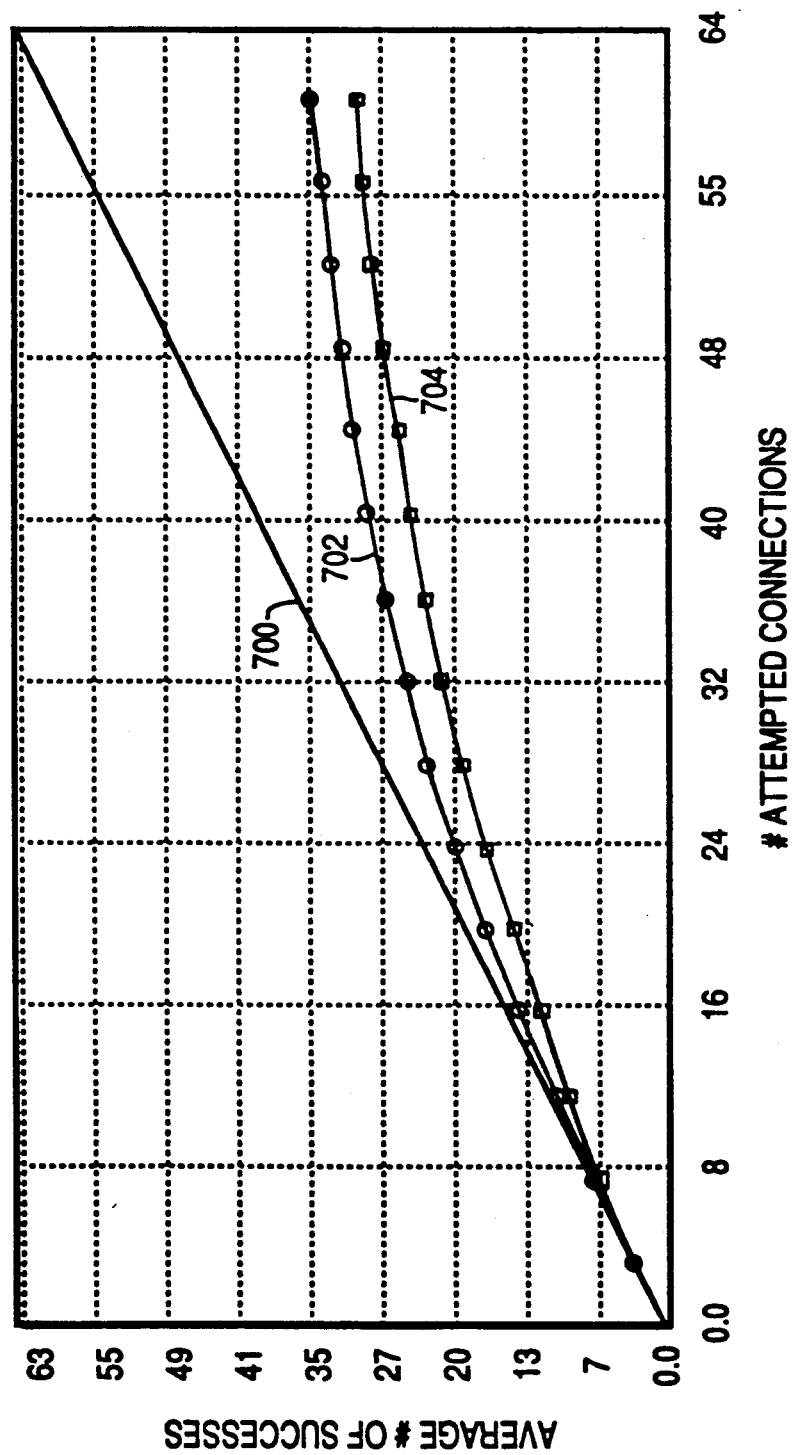
FIG. 7 plots the average number of simultaneously attempted combinations versus the number of simultaneously successful combinations.

In operation, the banyan interconnection network is switched during computing operations so as to connect the output of a processor to the input of another processor in order to continue the processing. The banyan network is an example of a blocking network, in which any processor may be interconnected with any other processor, but not all of the possible connections may be made simultaneously. Another blocking network is a telephone exchange, in which any telephone may be connected to any other, but not all connections may be made simultaneously. Plot 702 of FIG. 7 illustrates the result of a large number of attempted simultaneous connection for a banyan network similar to FIG. 2. Plot 700 of FIG. 7 represents a perfect result which might be provided by a 64×64 crossbar switch, i.e. all attempted connections are always successful.

As so far described, a prior art computing system using a crossbar switch arrangement such as that of FIG. 2 includes a single module of banyan network 200. It is clear from FIG. 2 that the arrangement requires extensive wiring. It is not at all clear how the arrangement of FIG. 2 could be broken into submodules, or if submodules were generated, how the inter-submodule wiring could be reduced to more manageable levels. For example, if the arrangement of FIG. 2 were to be divided into two modules along dash line 24, there would be 128 data paths interconnecting the two modules. On the other hand, if network 200 were to be divided into eight submodules along a plurality of parting lines similar to parting line 26, there would be seven interconnection regions, each crossed by 28 data paths, for a total of 196 interconnections. Thus, interconnecting processors by the use of a full banyan network according to this prior art arrangement requires fabrication of a single extremely complex module as in FIG. 2, or the generation of a greater number of modules, each requiring extensive custom wiring between modules.

Figure 3:
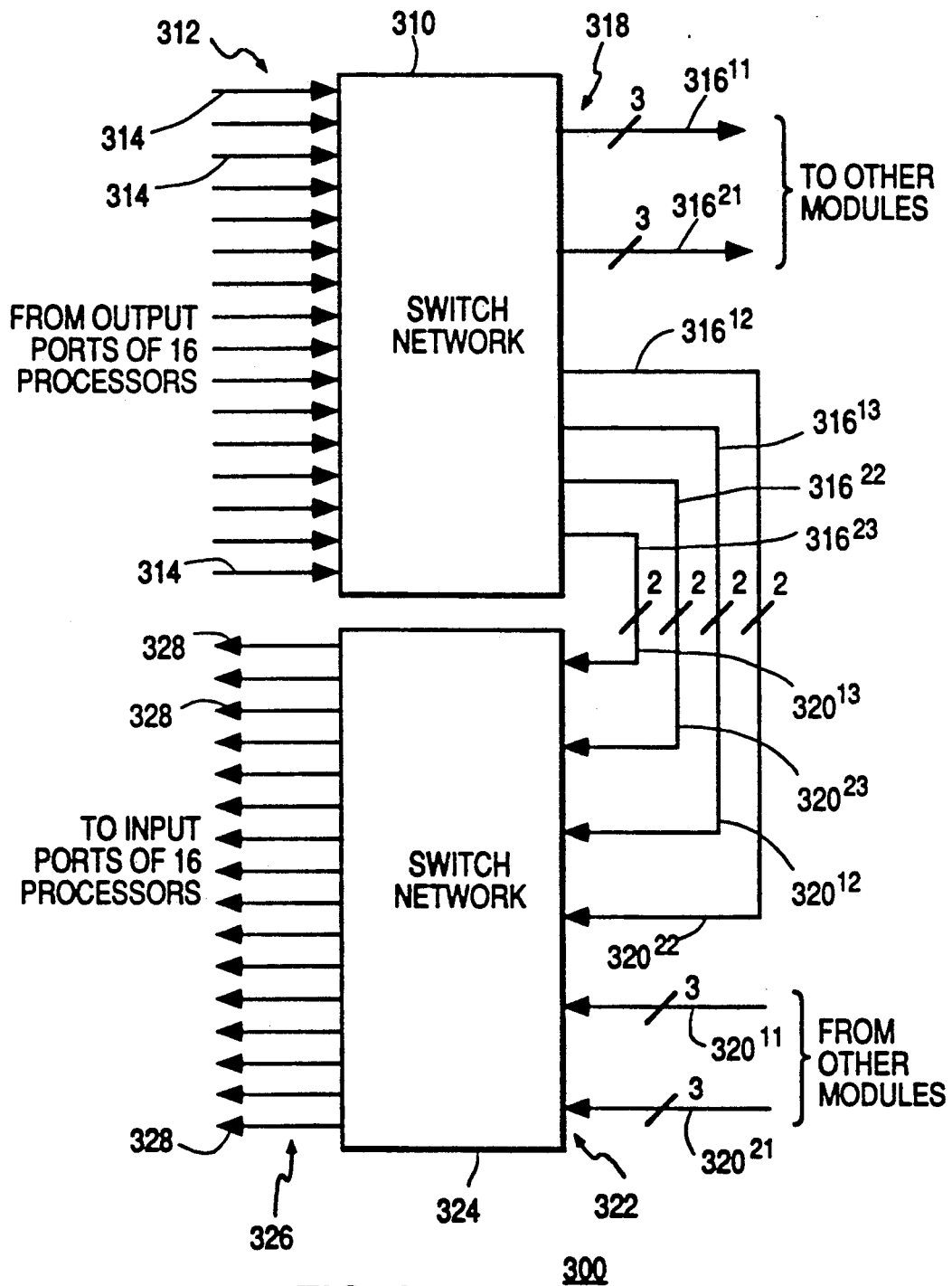
FIG. 3 is a simplified block diagram of a communication module according to the invention.

FIG. 3 illustrates in simplified block diagram from a module 300 according to the invention. In FIG. 3, a first stage switching network 310 includes an input port designated generally as 312 which includes 16 data paths, some of which are designated 314. Switch network 310 is capable of connecting any of the data paths 314 of its input port 312 with any of the data paths 316 of an output port 318. As illustrated in FIG. 3, switch network 310 includes fourteen output data paths of an output port 318, three of which are designated $316^{11}$ and an additional three of which are designated $316^{21}$, all six of which are adapted to be connected to other modules similar to module 300 of FIG. 3. Four pairs of additional output data paths of output port 318 are designated $316^{12}$, $316^{13}$, $316^{22}$, and $316^{23}$, for a total of eight data paths, which are connected to input data paths 320 of an input port 322 of a second stage of switch network 324. Input port 322 of switch network 324 includes fourteen input data paths 320, including four pairs of input data paths $320^{12}$, $320^{13}$, $320^{22}$, and $320^{23}$, for a total of eight data paths. Input data path pair $320^{12}$ of second stage switch 324 is coupled to output data path pair $316^{13}$ of first stage switch 310, input data path pair $320^{13}$ is coupled to output data path pair $316^{23}$ of input port 322 of first stage switch network 310, input data path pair $320^{22}$ of input port 322 of second stage switch network 324 is coupled to output data path pair $316^{12}$ of output 322 of first stage switch network 310, and input data path pair $320^{23}$ of input port 322 of second stage switch network 324 is connected to output data path pair $316^{22}$ of output port 318 of first stage switch network 310.

Figure 4A:
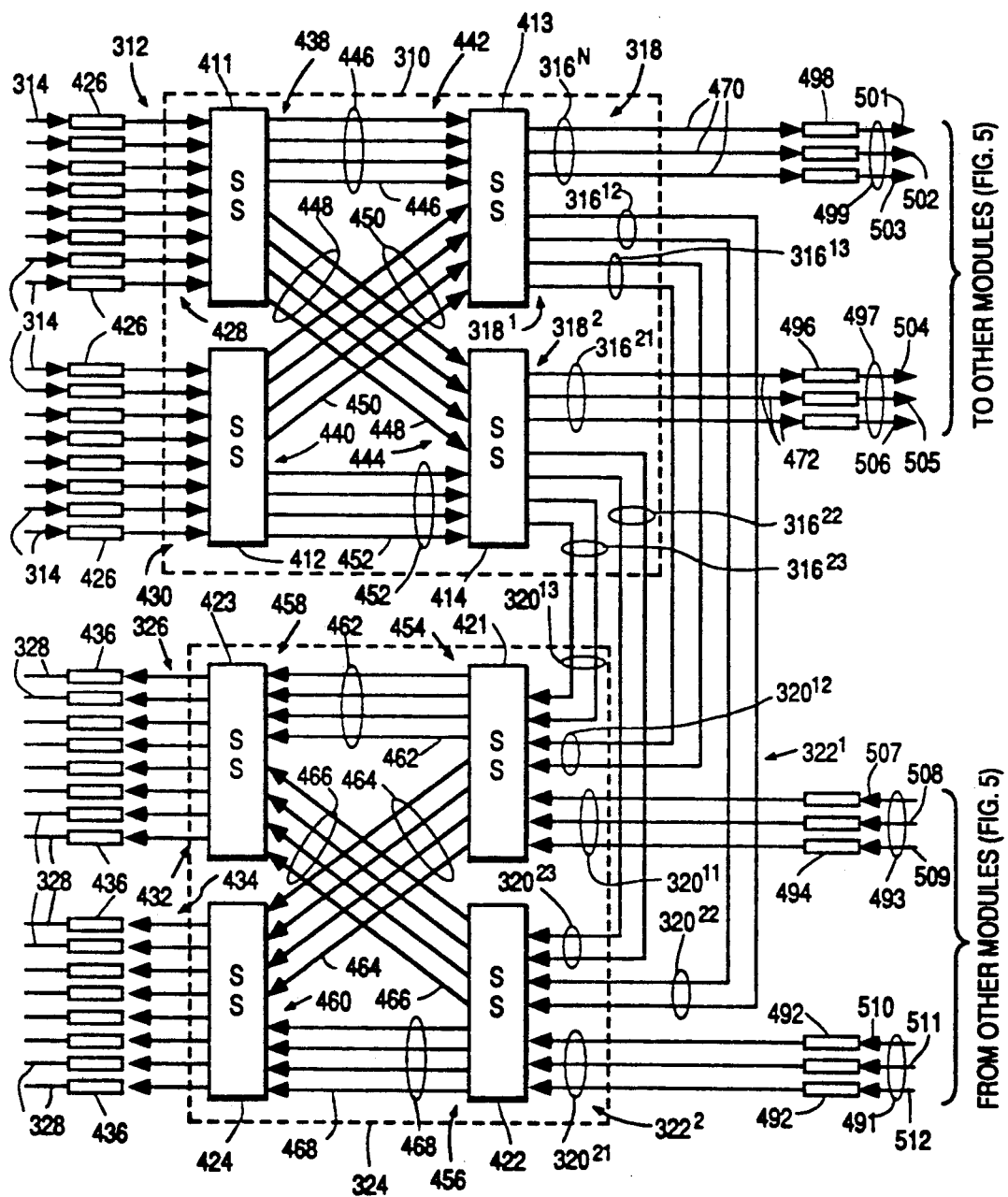
FIG. 4a is a more detailed block diagram of the arrangement of FIG. 3.

An additional six input data paths of input port 322 of second stage switch network 324 of FIG. 4a are grouped into two triads $320^{11}$ and $320^{21}$, which are adapted to be connected to other modules 300 similar to that of FIG. 3. Switch network 324 includes an output port 326 which includes sixteen data paths 328. Data paths 328 are adapted to be connected to the input ports of sixteen processors of the system with which the communications module 300 of FIG. 3 is associated.

FIG. 4a is a more detailed block diagram of module 300 of FIG. 3. Elements of FIG. 4a corresponding to those of FIG. 3 are designated by the same reference numerals. In FIG. 4a, first switch stage 310 is illustrated as including a first switching substage (55) 411. Switch stage 310 also includes a further switch substage 412, and third and fourth switch substages 413 and 414, respectively. Similarly, switch stage 324 includes first, second, third and fourth switch substages 421, 422, 423 and 424, respectively. Each switch substage 411–414 (where the hyphen represents the word "through") is an 8×8 crossbar switch such as that described in conjunction with FIG. 2, and which is described in more detail in FIG. 6. In short, each 8×8 crossbar switch may be controlled to simultaneously connect any of its eight input data paths to any of its eight output data paths. Also, any plurality of input data paths may be connected to any single output data path.

As illustrated in FIG. 4a, input port 312 of switch stage 310 includes sixteen data paths 314, eight of which are coupled to an input port 428 of switch substage 411, and the other eight which are coupled to input port 430 of switch substage 412. Thus, input port 312 of switch stage 310 is formed from or comprises input ports 428 and 430 of switch substages 411 and 412, respectively. Each data path 314 is adapted to be coupled to an output port of one processor (not illustrated) of the computing system, as described above. Ordinarily, such an output port of a processor will include plural bit paths, e.g. 16 bits. In order for 8×8 crossbar switch substage 411 to receive and route data from eight processors, all the bit paths from each processor must be handled by one input data path of a crossbar switch, so the data entering the crossbar switch must be in serial form. For purposes of the invention, parallel data is conceptually equivalent to serial data. In order to convert the parallel data arriving from the processors into serial data, each data path 314 includes a parallel-to-serial converter, some of which are designated 426. Such parallel-to-serial converters are well known in the art, and require no further explanation.

As illustrated in FIG. 4a, output port 326 of switch stage 324 includes sixteen data paths 328, eight of which are connected to the eight data paths of output port 432 of switch substage 423, and eight of which are connected to the eight data paths of output port 434 of switch substage 424. As mentioned, each data path 328 of output port 326 of switch stage 324 is adapted to be coupled to the input port of a processor or system I/O memory device (not illustrated) associated with the computing system with which communication system 300 is associated. Just as in the case of the output ports, the input ports of the processors are ordinarily arranged to operate with parallel data. In order to be able to use a single 8×8 crossbar switch for each of switch substages 423 or 424, serial-to-parallel converters illustrated as 436 are coupled in each data path 328. Thus, on each data path 328, serial signals arrive at each serial-to-parallel converter 436 from crossbar switches 423 or 424, and the serial signals are converted therein to parallel form. The parallel signals are then conveyed over the remainder of data paths 328 to the input ports (not illustrated) of the associated processors.

Within switch stage 310 of FIG. 4a, certain interconnections are provided between the output ports 438 and 440 of switch substages 411 and 412, respectively, and the input ports 442 and 444 of switch substages 413 and 414, respectively. In particular, four data paths 446 are coupled between a first portion of output port 438 of switch substage 411 and a first portion of input port 442 of switch substage 414. A second set of four data paths 448 extends between a second portion of output port 448 of switch substage 411 and a first portion of input port 444 of switch substage 414. Also, four data paths 450 extend between a first portion of output port 440 of switch substage 412 and a second portion of input port 442 of switch substage 413. Lastly, four data paths 452 extend between a second portion of output port 440 of switch substage 412 and a second portion of input port 444 of switch substage 414.

Similarly, four data paths 462 in FIG. 4a extend between a first portion of an output port 454 of switch substage 421 and a corresponding number of input data paths of a first portion of input port 458 of switch substage 423. Four data paths 464 extend between a second portion of output port 454 of switch substage 421 and a first portion of an input port 456 of switch substage 424. Four data paths 466 extend between a first portion of an output port 456 of switch substage 422 and a second portion of input port 458 of switch substage 453. Lastly, four data paths 468 extend between a second portion of output port 456 of switch substage 422 and a second portion of input port 460 of switch substage 422.

In FIG. 4a, the six data paths of two triads ($316^{11}$ and $316^{21}$ of FIG. 3) at output port 318 of switch substage 310 are divided, so that three data paths $316^{11}$ carry serial data from a first portion of the output port $318^1$ of switch substage 413 to three laser transmitters designated together as 498, which convert the data into light for transmission over fiber optic cables 499 to other modules 300 of the system. Similarly, three data paths $316^{12}$ carry serial data from a first portion of output port $318^2$ of switch substage 414 to three laser transmitters designated 496, which convert the data to light form for transmission over three fiber optic cables 497 to the other modules.

Three fiber optic cables 493 of FIG. 4a carry data in the form of light pulses from other modules of the communication system to light converters of detectors 494, which produce serial electrical signals for application to data paths $320^{11}$ of a first portion of a input port $322^1$ of switch substage 421. Three further fiber optic cables 491 carry data from other modules of the communication system to three light detectors designated 492, which convert the light pulses to electrical serial data for application to three data paths $310^{21}$ which constitute a first portion of an input port $322^2$ of switch substage 422.

Two data paths $316^{12}$ of FIG. 4a couple data from a second portion of output ports $318^1$ of switch substage 413 to two data paths $320^{22}$ of a second portion of input port $322^2$ of switch substage 422. Two further data paths $316^{13}$ couple data from a third portion of output port $318^1$ of switch substage 413 to two data paths $320^{12}$ of a second portion of input port $322^1$ of switch substage 421. Two data paths $316^{22}$ carry data from a second portion of output port $318^2$ of switch substage 414 to two data paths $320^{23}$ of a third portion of input port $322^2$ of switch substage 422. Two additional data paths $316^{23}$ carry data from a third portion of output port $318^2$ of switch substage 414 to two data paths $320^{13}$ of a third portion of input port $322^1$ of switch substage 421. These data paths provide local communications among the data processors connected to this particular module 300 of the system, without the necessity for off-module interconnections.

Figure 4B:
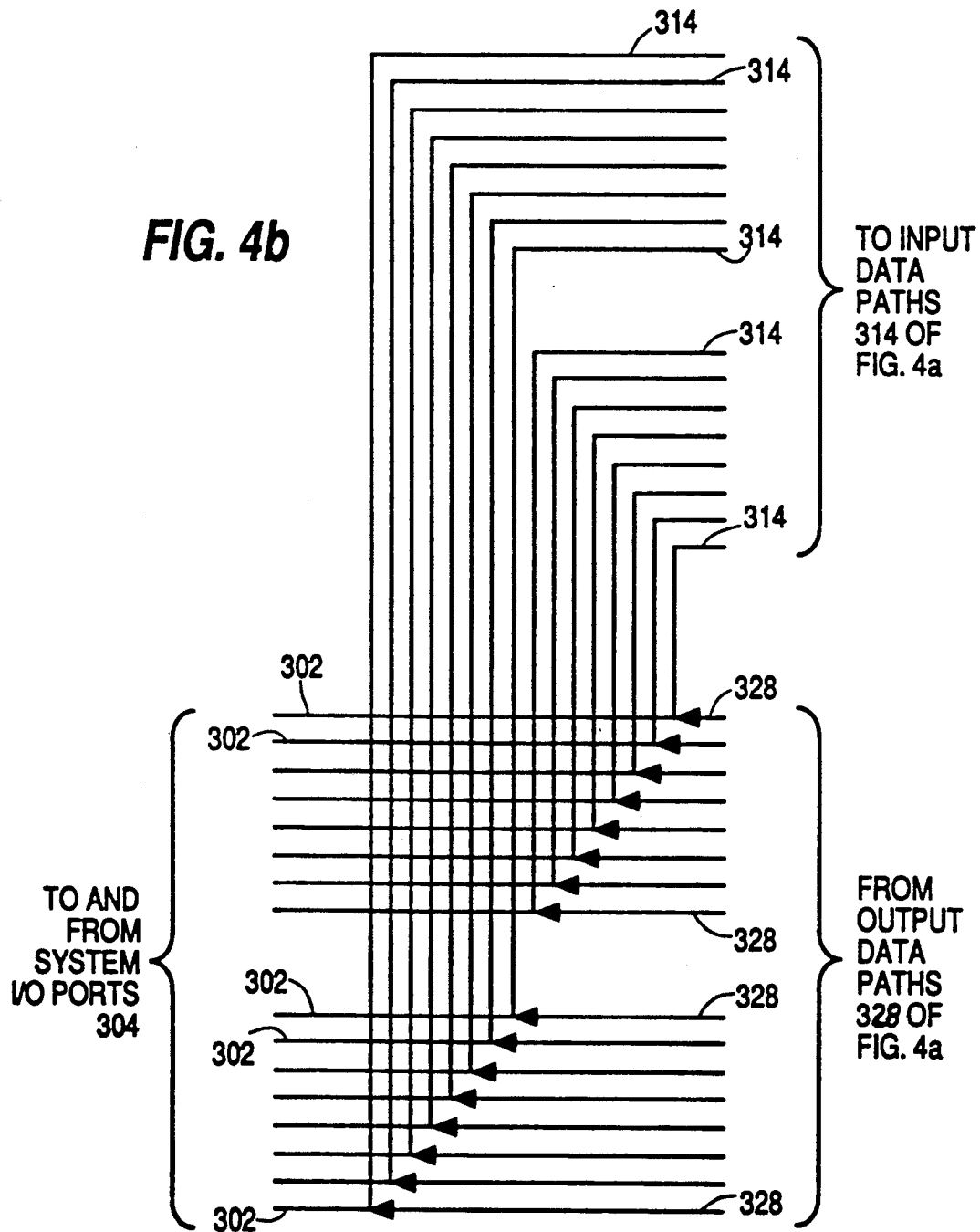

It should particularly be noted that some data processors include a single input-output port rather than separate input and output ports. FIG. 4b illustrates interconnections between the input and output data paths of module 300 of FIG. 4a. In FIG. 4b, a plurality of 16-bit input-output (I/O) data paths 302, designated jointly as 304, are each connected to a 16-bit input data path 314 and to a 16-bit output data path 328.

Figure 5:
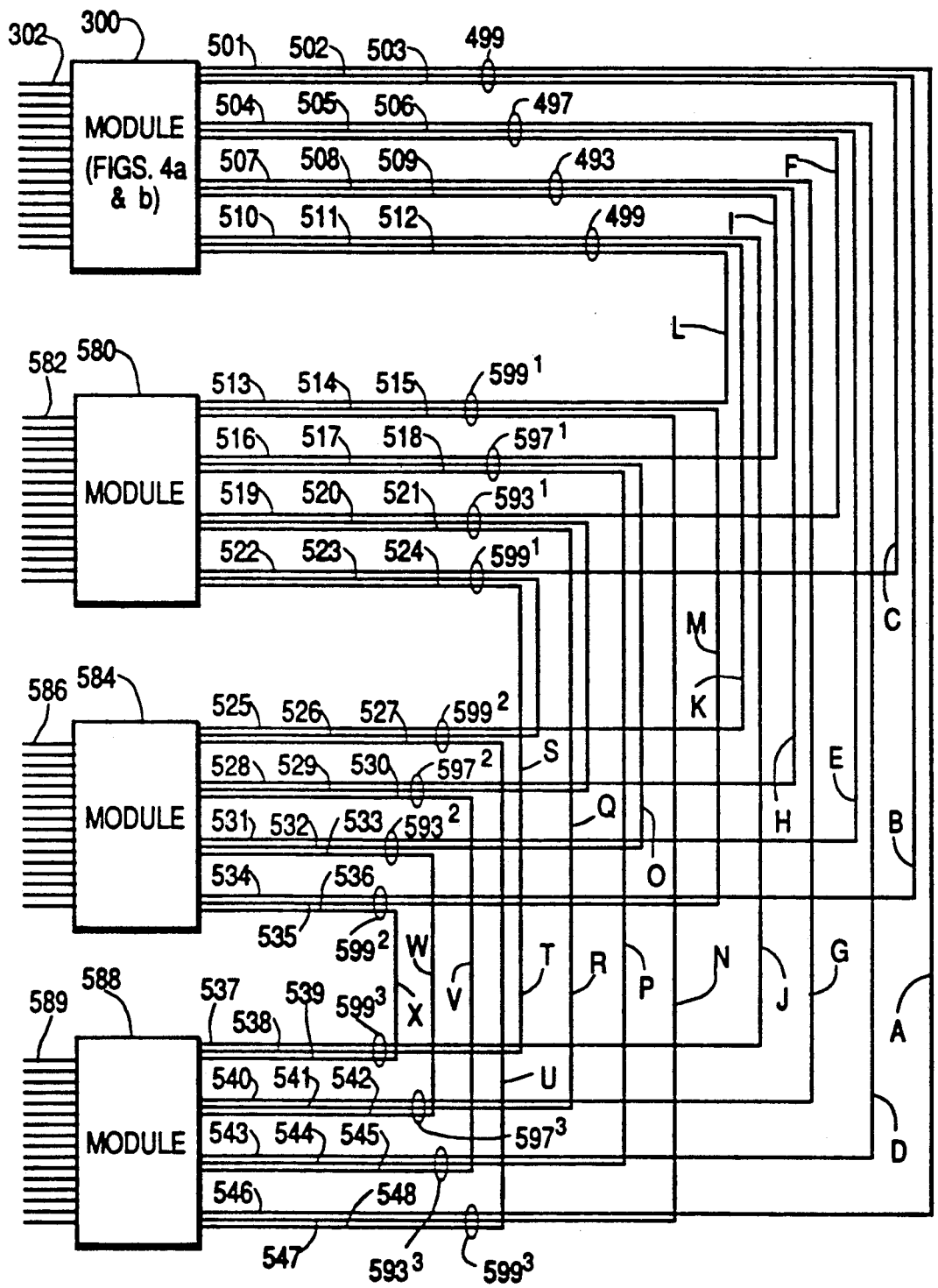
FIG. 5 illustrates the interconnections required for a plurality of modules such as those of FIG. 4 to provide the same function as the arrangement of FIG. 2.

FIG. 5 illustrates the use of a plurality of modules such as module 300 of FIGS. 3 and 4. Elements of FIG. 5 corresponding to those of FIG. 4 are designated by the same reference numerals.

In FIG. 5, module 300 as described in conjunction with FIGS. 4a and 4b is arrayed together with three other similar modules 580, 584 and 588. The sixteen I/O data paths 302 of modules 300 are each connected with the I/O port of one processor of an array of 64 processors (not illustrated). The 16 I/O data paths 582 of module 580 are each coupled to the I/O port of one processor of the array. Similarly, the I/O data paths 586 and 589 of modules 584 and 588, respectively, are each connected to the I/O port of one of the processors of the array. Each data paths 302, 582, 586, and 589 comprises a 16-bit parallel path.

In general, each module of FIG. 5 includes six interconnection output data paths and six interconnection input data paths. Each interconnection output data path is connected to one interconnection input data path. Consequently, there are a total of 24 interconnection data paths in the arrangement of FIG. 5 which may be, as described in conjunction with FIG. 4a, fiber-optic cables. These 24 data paths are designated A through X in FIG. 5.

A first output data path 501 of group 499 of output data paths from module 300 is coupled by path A to an input data path 546 of a group $599^3$ of input data paths of module 588. A second output data path 502 of group 499 of output data paths from module 300 is coupled by path B to an input data path 534 of a group $599^2$ of input data paths of module 584. A third output data path 503 of group 499 of output data paths from module 300 is coupled by path C to an input data path 522 of a group $599^1$ of input data paths of module 580.

A first output data path 504 of a group 497 of output data paths from module 300 is coupled by path D to an input data path 543 of a group $593^3$ of input data paths of module 588. A second output data path 505 of group 497 of output data paths from module 300 is coupled by path E to an input data path 531 of group $593^2$ of input data paths of module 584. A third output data path 506 of group 497 of output data paths from module 300 is coupled by path F to an input data path 519 of a group $593^1$ of input data paths of module 580.

A first output data path 540 of group $597^3$ of output data paths from module 588 is coupled over a path G to input data path 507 of group 493 of input data paths of module 300. A second output data path 541 of group $597^3$ of output data paths from module 588 is coupled by path R to input data path 521 of a group $593^1$ of input data paths of module 580. The remaining connections are apparent from FIG. 5 and the preceding description.

In general, sixteen processors of the 64-processor array are coupled to each module. In operation, the output ports of eight of the processors coupled to input port 312 of module 300 of FIG. 4a may be coupled to the input ports of the other eight processors to form an array of eight two-processor cascades. This is accomplished by, for example, controlling crossbar switch substage 411 of module 300 of FIG. 4a to couple four of the input data paths from port 312 by way of path 446 to switch substage 413, and the other four by way of path 448 to substage 414. In turn, switch substage 413 is controlled to couple its four input data paths 446 by way of output paths $316^{12}$ and $316^{13}$ to switch substages 421 and 422. Similarly, switch substage 414 couples its four input data paths 448 by way of output paths $316^{22}$ and $316^{23}$ to switch substages 421 and 422. Switch substage 421 is controlled to couple its input data paths $320^{13}$ and $320^{12}$ by way of path 462 to switch substage 423. Switch substage 422 is controlled to couple its input data paths $320^{22}$ and $320^{23}$ by way of path 466 to switch substage 423. Switch substage 423 couples its eight input paths 462 and 466 to the inputs of the other eight processors by way of paths 328. The first eight processors of the cascade receive their inputs by way of only six inputs from other modules. Any of the 16 processors coupled to a module may receive inputs from other modules by way of input triads $320^{11}$ and $320^{21}$.

FIG. 6a illustrates in schematic form an nxn crossbar switch 600, including an n-data-path input port 602 and an n-data-path output port 604. A crossing node such as 606 may be open or closed. If open, no connection is made. If closed, signal can flow from the associated data input of input port 602 to the associated data output of output port 604. As mentioned, more than one node may be closed, as for example nodes 606, 608 and 610 may be closed, to connect input data path 1 to output data paths 2 and 4, and to connect input data path 2 to output data path 3.

FIG. 6b illustrates the use of an AND gate 650 at typical node 608. The output of AND gate 650 is coupled to the bus line 620 which terminates on output data path 4, and an input terminal 624 of AND gate 650 is coupled to the bus line 622 which originates from input data path 1. A second input terminal 652 of AND gate 650 is adapted to receive control signals for determining whether the node is open or closed.

FIG. 7 is a plot of successful interconnections versus attempted different interconnections for the 3-stage banyan network of FIG. 2 using 8×8 crossbar switches, and for the embodiment of the invention. As mentioned, a first plot 700 in FIG. 7 represents the theoretical ideal performance which would be provided by a 64×64 crossbar switch: each attempted connection (along the abscissa) is successful (ordinate). Plot 702 represents the number of successful completions provided by the 3-stage banyan network of FIG. 2. Plot 704 represents the successes provided by the structure of the invention described in conjunction with FIG. 5, using four modules such as that of FIG. 4a. The particular embodiment of the invention provides about 90% of the throughput of the banyan network.

In general the number x of off-module interconnections (inter-module connections), such as those illustrated in FIG. 5, lies in the range $$m - 1 \leq x \leq n(1 - n/N),$$

where
 m is the total number of modules in the system,
 n is the number of processors per module, and
 N is the number of processors in the system. Note that N = nm.

An optimal value for x may be found by optimizing performance relative to cost, $$P/c \; \alpha \; P/x$$

Figure 8:
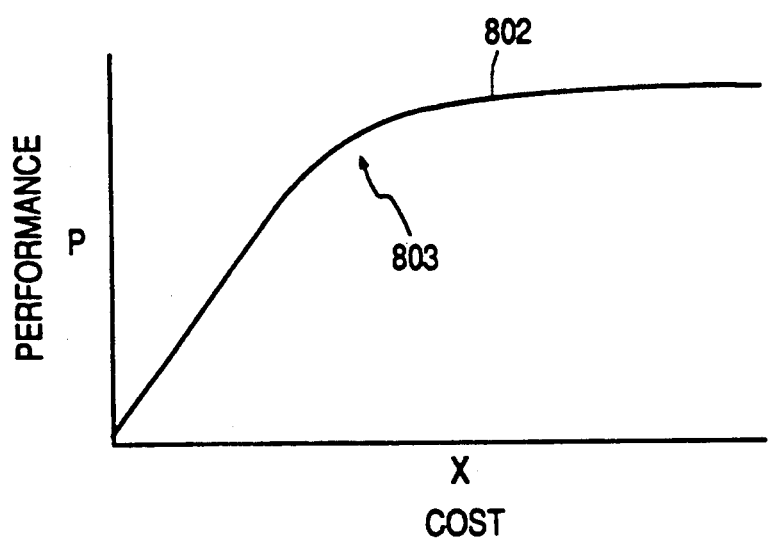
FIG. 8 illustrates the form of a plot of performance versus the number of inter-module connections.

FIG. 8 illustrates the general form of curve 802, representing P versus x.

As illustrated in FIG. 8, plot 802 has a knee in the region 803. Knee 803 is near the optimum point, because the performance has diminished minimally while the number of intermodule connections x, and therefore the cost c, are significantly less than the maximum. Put another way, the incremental performance attributable to an incremental module interconnection is small when the number of extant interconnections is large.

The value x must be an integer, because it is not possible to have partial interconnections. The integer is chosen to be the closest integer to $$\frac{n(1 - n/N) - (m - 1)}{2},$$

where "closest" means identical to or larger than, so that x/(m−1) is an integer, so that the number of connections to each of the modules is the same, i.e. the connections are evenly distributed. For example, in the arrangement of FIG. 5, given n=16, N=64, and m=4, in order to determine the number of module interconnections $$x = \frac{n(1 - n/N) - (m - 1)}{2},$$

$$x = \frac{16(1 - 16/64) - (4 - 1)}{2}$$

x = 4.5, which is not an integer.

Then, x/(m−1)=4.5/3 32 1.5.
The next larger integer is 2.

The integer value of $x=2(m-1)=6$, which corresponds with the number of inter-module connections illustrated in FIG. 5.

Other embodiments of the invention will be apparent to those skilled in the art. For example, while parallel-to-serial and serial-to-parallel converters have been described in conjunction with the embodiment of FIG. 4a to reduce the number of parallel bit paths associated with each data path at the crossbar switches and in the module interconnections, full parallel bit paths may be used by eliminating the converters. This may have an advantage in reducing the bandwidth of the signal on each bit path. The crossbar switch of FIG. 6 has been described as unidirectional, but may be bidirectional. While laser transmitters with photosensitive detectors have been described for intermodule connections, other high-speed interconnection media could be used, as for example microwave signals. The particular application of the communication system described herein has been to a parallel data processor, but similar interconnections may be provided among robots, sensors, terminals or the like.

What is claimed is:

1. A modular multistage switch for simultaneously communicating between a system output port and a system input port, where said system input and output ports each include at least first and second data paths, each module comprising:

a first stage of blocking switch means, said first stage of blocking switch means including an input port with $M_1$ data paths and an output port with $N_1$ data paths, where one of the $M_1$ data paths of said input port of said first stage of switch means are connected to one of the $N_1$ data paths of said output port of said first stage of switch means, said first stage of blocking switch means comprising;

a first substage of full crossbar switch means including an input port of $P_1$ data paths and an output port of $Q_1$ data paths, where $P_1=M\frac{1}{2}$, $Q_1 M\frac{1}{2}$, and where one of the $P_1$ data paths of said input port of said first substage of switch means is connected to one of the $Q_1$ data paths of said output port of said first substage of switch means, said input port of said first substage of switch means constituting one portion of said input port of said first stage of blocking switch means;

a second substage of full crossbar switch means including an input port of $P_2$ data paths and an output port of $Q_2$ data paths, where $P_2=M\frac{1}{2}$, $Q_2=M\frac{1}{2}$, and where one of the $P_2$ data paths of said input port of said second substage of switch means is connected to one of the $Q_2$ data paths of said output port of said second substage of switch means, said input port of said second substage of switch means constituting an other portion of said input port of said first stage of blocking switch means;

a third substage of full crossbar switch means including an input port of $P_3$ data paths and an output port of $Q_3$ data paths, where $P_3\frac{1}{2}$, $Q_3=M\frac{1}{2}$ and where one of the $P_3$ data paths of said input port of said third substage of switch means is connected to one of the $Q_3$ data paths of said output port of said third substage of switch means, said output port of said third substage of switch means constituting one portion of said output port of said first stage of blocking switch means;

a fourth substage of full crossbar switch means including an input port of $P_4$ data paths and an output port of $Q_4$ data paths, where $P_4=M\frac{1}{2}$, $Q_4=M\frac{1}{2}$ and where one of the $P_4$ data paths of said input port of said fourth substage of switch means is connected to one of the $Q_4$ data paths of said output port of said fourth substage of switch means, said output port of said fourth substage of switch means constituting an other portion of said output port of said first stage of blocking switch means;

sixth interconnection means coupled to a first portion of said output port of said first substage of switch means and to a first portion of said input port of said third substage of switch means;

seventh interconnection means coupled to a second portion of said output port of said first substage of switch means and to a first portion of said input port of said fourth substage of switch means;

eighth interconnection means coupled to a first portion of said output port of said second substage of switch means and to a second portion of and input port of said third substage of switch means; and ninth interconnection means coupled to a second portion of said output port of said second substage of switch means and to a second portion of said input port of said fourth substage of switch means;

a second stage of blocking switch means, said second stage of switch means including an input port with $M_2$ data paths and an output port with $N_2$ data paths, where one of the $M_2$ data paths of said input port of said second stage of switch means is connected to one of the $N_2$ data paths of said output port of said second stage of switch means, said second stage of blocking switch means comprising;

a fifth substage of full crossbar switch means including an input port of $P_5$ data paths and an output port of $Q_5$ data paths, where $P_5=M2/2$, $Q_5=M2/2$, and where one of the $P_5$ data paths of said input port of said fifth substage of switch means is connected to one of the $Q_5$ data paths of said output port of said fifth substage of switch means, said input port of said fifth substage of switch means constituting one portion of said input port of said second stage of blocking switch means;

a sixth substage of full crossbar switch means including an input port of $P_6$ data paths and an output port of $Q_6$ data paths, where $P_6=M2/2$, $Q_6=M2/2$, and where one of the $P_6$ data paths of said input port of said sixth substage of switch means is connected to one of the $Q_6$ data paths of said output port of said sixth substage of switch means, said input port of said sixth substage of switch means constituting an other portion of said input port of said second stage of blocking switch means;

a seventh substage of full crossbar switch means including an input port of $P_7$ data paths and an output port of $Q_7$ data paths, where $P_7=M2/2$, $Q_7=M\frac{1}{2}$, and where one of the $P_7$ data paths of said input port of said seventh substage of switch means is connected to one of the $Q_7$ data paths of said output port of said seventh substage of switch means, said output port of said seventh substage of switch means constituting one portion of said output port of said second stage of blocking switch means;

an eighth substage of full crossbar switch means including an input port of $P_8$ data paths and an output port of $Q_8$ data paths, where $P_8 = M2/2$, $Q_8 = M\frac{1}{2}$, and where one of the $P_8$ data paths of said input port of said eights substage of switch means is connected to one of the $Q_8$ data paths of said output port of said eighth substage of switch means, said output port of said eighth substage of switch means constituting an other portion of said output port of said second stage of switch means;

tenth interconnection means coupled to a first portion of said output port of said fifth substage of switch means and to a first portion of said input port of said seventh substage of switch means;

eleventh interconnection means coupled to a second portion of said output port of said fifth substage of switch means and to a first portion of said input port of said eighth substage of switch means;

twelfth interconnection means coupled to a first portion of said output port of said sixth substage of switch means and to a second portion of said input port of said seventh substage of switch means;

thirteenth interconnection means coupled to a second portion of said output port of said sixth substage of switch means and to a second portion of said input port of said eights substage of switch means;

first interconnection means, coupled to said input port of said first stage of blocking switch means and adapted to be interconnected with said system output port;

second interconnection means, coupled to said output port of said second stage of blocking switch means and adapted to be interconnected with said system input port;

third interconnection means coupled to data paths of a portion of said output port of said first blocking switch means and adapted to be interconnected with switch means of other similar modules;

fourth interconnection means coupled to data paths of a portion of said input port of said second blocking switching means and adapted to be interconnected with switch means of other similar modules; and fifth interconnection means coupled to data paths of a portion of said output port of said first blocking switch means and to data paths of a portion of said input port of said second blocking switch means for local communication between said system input and output ports.

2. A system according to claim 1, wherein:

said third interconnection means includes a first portion coupled to a first portion of said $Q_3$ data paths of said output ports of said third substage of switch means and a second portion coupled to a first portion of said $Q_4$ data paths of said output port of said fourth substage of switch means;

said fourth interconnection means includes a first portion coupled to a first portion of said $P_5$ data paths of said input port of said fifth substage of switch means and a second portion coupled to a first portion of said $P_6$ data paths of said input port sixth substage of switch means; and said fifth interconnection means includes (1) a first intraconnection portion coupled to a second portion of said $Q_3$ data paths of said output port of said third substage of switch means and to a second portion of said $P_6$ data paths of said input port of said sixth substage of switch means, (2) a second intraconnection portion coupled to a third portion of said $Q_3$ data paths of said output port of said third substage of switch means and to a second portion of said $P_5$ data paths of said input port of said fifth substage of switch means, (3) a third intraconnection portion coupled to a second portion of said $Q_4$ data paths of said output port of said fourth substage of switch means and to a third portion of said $P_6$ data paths of said input port of said sixth substage of switch means, and (4) a fourth intraconnection portion coupled to a third portion of said $Q_4$ data paths of said fourth substage of switch means and to a third portion of said $P_5$ data paths of said input port of said fifth substage of switch means.

3. A system according to claim 2 wherein said $P_1$ data paths of said input port of said first substage of switch means and said $Q_8$ data paths of said output port of said eights substage of switch means, are combined to form bidirectional paths, and said $P_2$ data paths of said input port of said second substage of switch means and said $Q_7$ data paths of said output port of said seventh substage of switch means are combined to form bidirectional paths.

* * * * *